Feb. 10, 1925.

H. F. ROACH

ANAMORPHOUS TOTAL REFLECTING PRISMS

Filed Jan. 9, 1923

1,525,657

INVENTOR
Harry F. Roach
BY Bruce S. Elliott
ATTORNEY

Patented Feb. 10, 1925.

1,525,657

UNITED STATES PATENT OFFICE.

HARRY F. ROACH, OF ST. LOUIS, MISSOURI.

ANAMORPHOUS TOTAL-REFLECTING PRISMS.

Application filed January 9, 1923. Serial No. 611,570.

*To all whom it may concern:*

Be it known that I, HARRY F. ROACH, a citizen of the United States, residing in the city of St. Louis and State of Missouri, have invented new and useful Improvements in Anamorphous Total-Reflecting Prisms, of which the following is a specification.

This invention relates to optical apparatus, and has special reference to the production of an optical instrument which may be used in connection with an appropriate lens system in producing photographic reproductions, in which the dimensions of the object reproduced are relatively magnified in a certain direction,—that is to say, in a direction substantially parallel with a given axis.

In my pending application, Serial No. 537,436, filed February 18, 1922, I have shown and described a form of apparatus for accomplishing the same purpose as that herein contemplated. In said prior application, I show and describe a construction involving the employment of lenses and reflecting surfaces, the latter in the form of mirrors, and the parts being mounted in a casing. Such an apparatus is necessarily of considerable size, relatively speaking, and it is necessary to provide within the casing various diaphragms in order to reduce the effect of diffused light within the lens box, or casing.

It is the object of the present invention to provide a simple and compact structure for use in conjunction with the lens system of a camera for producing anamorphous photographs, which shall be characterized by the employment of total reflecting prisms as the reflecting elements in place of mirrors, or the like. As a total reflecting prism both reflects light rays and permits their passage through it, it is possible to place the prisms of a reflecting system, disposed to produce anamorphous, in close proximity to each other, and to provide the necessary optical openings, to prevent the passage of any undesired rays through the prisms, by simply interposing a suitable opaque substance, in the form of a thin layer of flat black, between the meeting surfaces of the prisms, and extending over all but the area destined to constitute the optical opening. The diaphragms thus inserted are made an integral part of the instrument and hence when once installed may not be altered.

Having thus indicated in a general way the difference in the embodiment of the invention as compared with that shown in my prior application, I would state that the present form of apparatus, in common with that of said prior application, will have its greatest utility when employed as a means for determining the distortion in a structure when subjected to a load, or in observing the position of parts subject to minute movements. For example, by taking a photograph of the structure before it is subjected to the load and another photograph while the structure is subjected to the load, or after it has been so subjected, the instrument enables a relative magnification to be effected in the direction in which the distortions occur. Without being limited in application, the invention is designed more particularly for use in determining rail stresses developed by a passing train.

In addition to its use with optical instruments of the character indicated, my invention may also be utilized in the projection of light, as in the case of a search light.

The invention is illustrated in the accompanying drawing, in which—

Figure 4:
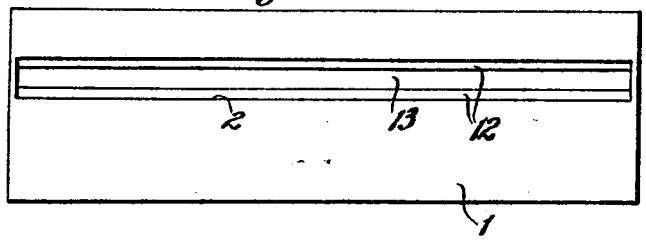
Figure 4 is a view in front elevation of my improved instrument, as shown in Figure 1.

Referring now to the drawing, the numeral 1 indicates a casing, preferably of metal, provided on one side with a relatively narrow rectangular opening 2, and on its opposite side, with a larger rectangular opening 3. For the purpose of securing an angular increment of separation of the light rays to produce an image having the property of balanced distortion at the image, I mount in the casing 1 a plurality of total reflecting prisms which may have the arrangement shown in either of Figures 1, 2 or 3 of the drawing.

Figure 1:
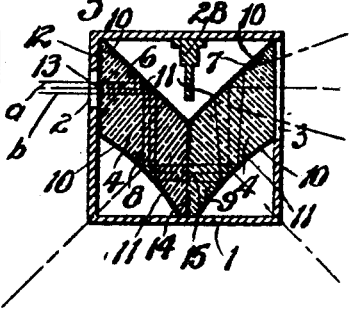
Figure 1 is a cross-sectional view through an instrument constructed according to my invention.

In Figure 1, I employ two of these prisms indicated, respectively, by the numerals 4 and 5, each of which presents a flat reflecting surface 6 and 7, respectively, extending at the preferred angle of 45° to the horizontal, and two convex cylindrical surfaces, 8 and 9, respectively, the curve of the perimeter of which may be that of a circle, but preferably is that of a conic section such as an ellipse, and the transverse axis of which conic section or ellipse is at an angle of 45° to the horizontal in each case. The axes of the conic section describing the contour of the surface of the cylinders in section bear an angle of 90° to each other, and the flat reflecting surfaces 6 and 7 bear an angle of 90° to each other. The exact degree of angularity shown, however, is not essential except that the angularity of the flat reflecting surfaces 6 and 7 must not be such as to cause the desired rays to impinge the flat reflecting surface to within the critical angle of the material of which the prism is made, and the axes of the conic sections describing the contour of the surface of the cylinders 8 and 9 in section must bear the same angle to each other as that of the reflecting surfaces 6 and 7 when the angle is 90°, and when the angle of the flat surfaces is other than 90° the angle of the axes of the cylindrical reflecting surfaces must be a supplement of the angle. Inasmuch as it is well known that any foreign substance, such as moisture, dust, or the like, on the reflecting surface of a total reflecting prism, impairs, to the point of destruction, the reflecting quality thereof, I preferably transfer the reflecting surfaces 6, 7, 8 and 9 of the prisms to a silver surface by coating the same with silver of the greatest whiteness, as indicated at 10, in each instance, and I protect the silver by coating the same, in turn, with a flat black substance, as indicated in each case by the numeral 11.

I am aware that in the optics of total reflecting prisms the reflecting surfaces need no reflecting element placed on them to cause the prisms to properly function as total reflecting prisms, and further that the placing of the reflecting element, such as silver, on these reflecting surfaces transfers the technical optical performance from that of a total reflecting prism to that of a prism whose total reflecting surface performs as a mirror. For practical reasons, however, it is preferable to place the reflecting medium on the reflecting surfaces, as this prevents any disturbance of the optical reflecting surface results, and also eliminates the necessity for the consideration of what is termed the "critical angle" in the pure total reflecting prism. Again, the use of total reflecting prisms with a reflecting medium, such as silver, placed on the optical reflecting surfaces, and a protection placed on the back of this reflecting medium, enables one to protect the reflecting medium, as against the effects of the weather, such as tarnishing; and mechanical disturbances, such as scratching; which, so far as the knowledge of the art of today is known to me, cannot be accomplished in any other form of construction or design than as herein described.

Where the silver is placed on the exterior surface and functions in the manner common to mirrors, the ray impinges the silver and does not pass through the medium on which the silver is placed. Accordingly, the silver reflecting element of the mirror is subject to the effects of the elements, is easily tarnished and is easily scratched. These are some of the fundamental and practical objections to the use of mirrors with the reflecting medium, silver, unprotected. These objections are overcome by the use of total reflecting prisms having a reflecting medium, such as silver, placed on the reflecting surfaces of the prisms and protected.

Hence, the use of the term "total reflecting prisms" in the specification and claims is to be understood to include total reflecting prisms with or without a reflecting medium, such as silver, placed on the reflecting surfaces of the prisms.

At what I will term the entering side of the instrument, or that at the left of Figure 1, a protecting coating of flat black 12 is also applied to the face of the prism at all except a given area destined to lie centrally of the opening 2, which area provides an optical opening 13 symmetrical with the optical plane of the instrument and through which the rays of light pass through the prism 4 to the reflecting surface 6. The whole interior of the casing 1 is also preferably coated with flat black to reduce the effect of any diffused light within the casing. The meeting faces of the two prisms 4 and 5 are also coated with flat black, as indicated at 14, except for a defined area constituting an optical opening 15, which is larger than the optical opening 13 to permit the passage therethrough of the rays which have been separated, or distorted, by the reflecting surface 8.

Figure 5:
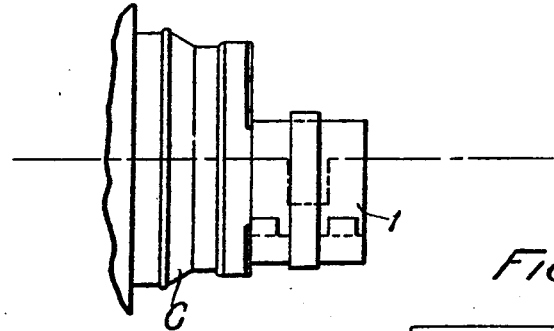
Figure 5 is a view in side elevation showing the lens of a camera with my improved instrument applied thereto.
Figure 6:
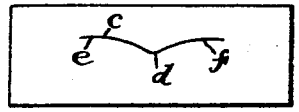
Figure 6 is a view showing a normal photograph of a line on a rail, which line has been caused to be bent or deflected while the rail was under stress, the curvature being greatly enlarged or magnified for the purpose of the illustration.

In actual operation, assuming it is desired to determine stresses developed, by a passing train, in a rail, a line is drawn on the rail and photographs of the rail taken with an ordinary camera of the portion of the rail containing the line before and after the train has passed over it, or while it is resting on the rail, at such point. These photographs are developed in the ordinary way, and then placed in an ordinary projecting, or enlarging, camera, such as C, on the outside of the lens of which my improved instrument is applied, as shown in Figure 5. When the image is projected through the lens of the camera, the light rays will be progressively and symmetrically distorted, as hereinafter explained, with the result that the image made on a sensitized plate by these rays will be distorted in one direction, as illustrated as to a line on a rail diagrammatically in Figure 6. My improved instrument, however, may be used in connection with an objective, in which event the optical opening 13 is exposed to the field.

Figure 2:
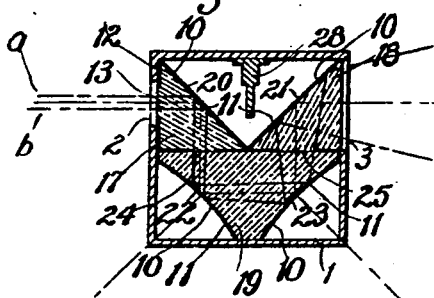
Figure 2 is a similar view showing a modified arrangement of the anamorphous total reflecting prisms.
Figure 3:
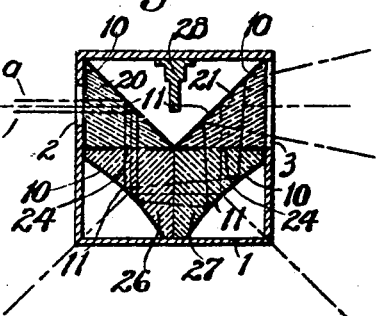
Figure 3 is a similar view showing a still further arrangement of the prisms.
Figure 7:
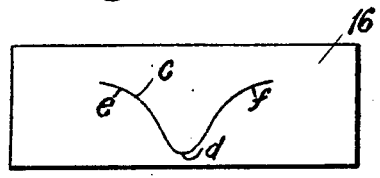
Figure 7 is a similar view showing the distortion effected by photographing the line on the rail with the use of my instrument.

In Figure 5, I have shown the lens of a projecting camera having my improved anamorphous total reflecting prisms, in the form of a composite instrument, applied thereto. In Figures 1, 2 and 3, I have shown diagrammatically the distortion of the rays effected by the curved surfaces 8 and 9. Thus, in a beam of light entering the optical opening 13, two rays "$a$" and "$b$," shown to be parallel, will strike the surface 6 and be reflected onto the curved reflecting surface 8. From this surface, the two rays will be reflected onto the curved surface 9, passing through the optical opening 15, and will impinge on the curved surface 9. This surface serves to further distort the rays in reflecting them onto the flat reflecting surface 7 and the latter reflects the rays through the opening 3, whence, of course, they would pass, in practice, onto the sensitized film, or plate. The axes of the two reflecting surfaces 8 and 9 are parallel, and the angular disposition of the reflecting surfaces to each other is such, that of any two symmetrical rays in any plane other than one parallel to the geometric axis of the curved reflecting surface cylinder, such as "$a$" and "$b$," passing onto the curved surface 8, that ray— in the case shown the ray "$b$"—having the greater angle of incidence will have the less angle of incidence as it impinges upon the curved surface 9. As shown, the effect of the reflecting surfaces 8 and 9 is to increase the divergence of all luminous rays passing in a plane at right angles to the axes of the reflectors. The result is that the total reflecting prisms, acting as reflectors, will co-operate with the lenses of a camera to produce an anamorphous image, or photograph, in which all measurements, or ordinates, parallel with the given axis, will be proportionately magnified. In the position of the instrument as shown in the drawings, the arrangement is such that all of the vertical ordinates on the image are greatly magnified, and hence the reflected photograph of a line on a rail while under stress will have somewhat the character of the curve "$c$," as indicated on the plate, or photograph, 16 in Figure 7. The points of highest bending moment in the rail will correspond to the sharp curves, as indicated at the points "$d$," "$e$" and "$f$" in the curve "$c$." By reason of the great magnification of the vertical ordinates, the curve will have a very characteristic dip in the vicinity of the loaded wheel. By the use of engineering formulae employing characteristics of the curve "$c$," one may readily ascertain the fibre stress within the rail.

It will be understood that the flat reflecting surfaces 6 and 7 merely act to transmit the rays received by them and do not, in any manner, vary their relation; and that the co-operation of the two curved reflecting surfaces 8 and 9 produces a substantially uniform, or balanced, distortion, or anamorphous effect of the image; that is to say, while the first curved reflector 8 would tend to produce a magnification in the desired direction, such a magnification would not be uniform until corrected, or compensated for by a reflection on the second curved reflector 8. This second reflector will thus produce a balanced effect at the image in the rays as finally reflected from the surface 7. In other words, the rays will have the same symmetrical arrangement at the image after having passed from the reflector 7 that they had when received upon the reflector 8.

Referring to Figure 2, I show an arrangement in which three total reflecting prisms are employed, as indicated, respectively, by the numerals 17, 18 and 19. The prisms 17 and 18 are substantially of the shape of a rightangle-triangle and present two flat reflecting surfaces 20 and 21 corresponding to the surfaces 6 and 7 of Figure 1. The prism 19 is of the general shape of an isosceles triangle, its two sides, however, being curved, as indicated at 22 and 23, respectively, to provide curved reflecting surfaces corresponding to the reflecting surfaces 8 and 9 of Figure 1. Optical openings 24 and 25 are provided between the meeting faces of the prisms for the passage of the light rays, as shown.

In Figure 3, I have shown an arrangement involving the employment of four total reflecting prisms, provided by using two prisms 26 and 27 in place of the single prism 19 of Figure 2, the arrangement being otherwise the same.

The meeting faces of all of the prisms as shown in the various figures are cemented together by the use of the finest Canadian balsam, and the flat black substance is applied, where shown, between the meeting faces by first etching the surfaces of the prism in the area surrounding the optical openings and then applying the flat black to the etched surfaces.

To brace the casing 1, I preferably insert a cross-bar 28 in the space at the top between the two flat sides of the prisms which is secured to the top and sides of the casing 1, by solder, or otherwise.

While I have shown and described my improved instrument as applicable to a camera which, as will be understood, may be either a projecting or enlarging camera or an objecting or photographic camera, it should be understood that my invention is not limited to such application, as its compactness and dimensions are such that it can be inserted in the lens box, or placed in front of the lens, of any other type of instrument, such as transits, levels, and the like.

The above described arrangement of total reflecting prisms assumes that no chromatic dispersion occurs in the passage of the light rays through the prisms, as the faces of the prisms at the entering and exit sides are parallel. There is authority for such assumption. In the event, however, it should be found, in use, that any degree of chromatic aberration occurs, this can be readily corrected by the employment of glasses of suitable indexes of refraction at the entering and exit sides of the instrument in a manner well known. My arrangement of total reflecting prisms lends itself readily to this adaptation, and also permits any desired number of corrections to be provided for, according to the number of prisms and glasses employed.

I also wish it understood that the principle of my invention involving the employment of total reflecting prisms for producing anamorphous effects in photography, or the like, may find its embodiment in other forms, shapes, or arrangements of total reflecting prisms than those shown in the drawings. For example, to those skilled in the art, it will be entirely obvious that the same relative arrangement of reflecting surfaces could be employed as that shown in Figure 8 of my application referred to, namely, with the curved reflecting surfaces alternating with the flat reflecting surfaces. It will also be obvious to those skilled in the art that the curved reflecting surfaces could be concave instead of convex, as shown, the only difference in result being that the reflected image would be smaller for any given size and dimension of prisms than the corresponding image reflected by the convex surfaces.

Finally, it should be stated that in applying the instrument to a camera, or the like, the optical plane of projection, or objection, of my instrument preferably should coincide with the optical axis of that of the lens system; although it will perform to produce balanced distortion in case it is placed otherwise, due to the relative positions of the reflecting surfaces.

I claim:—

1. On optical instrument comprising a combination of total reflecting prisms having two curved reflecting surfaces and two flat reflecting surfaces providing an optical plane of projection, the geometric axes of the respective curved surfaces extending through the points of impingement of the optical planes of projection, and intersecting, and forming, in connection with a horizontal line connecting said geometric axes, a triangle having equal angles at the base.

2. An optical instrument comprising a combination of total reflecting prisms having two curved reflecting surfaces and two flat reflecting surfaces providing an optical plane of projection, the geometric normal to the respective flat surfaces of reflection extending through the points of impingement of the optical plane of projection, and intersecting, and forming, in connection with a horizontal line connecting said geometric normals, a triangle having equal angles at the base.

3. An optical instrument comprising a combination of total reflecting prisms providing co-operating flat and curved reflecting surfaces angularly disposed with relation to each other to effect proportionate distortion in one direction in an image produced from rays of light passing through the prisms.

4. An optical instrument comprising a combination of total reflecting prisms providing co-operating flat and curved reflecting surfaces having such relative angular disposition that the central rays of a beam of light transmitted from one curved surface to the other will impinge in succession upon the said curved surfaces substantially on their optical central lines.

5. An optical instrument comprising a combination of total reflecting prisms providing a plurality of flat and curved reflecting surfaces angularly disposed to have light rays transmitted from one to the other in succession, the curved reflecting surfaces being at least two in number and having a relative position such that when two symmetrically located rays in any plane other than one parallel to the geometric axis of the curved reflecting surface cylinder in a beam of light impinge upon the first curved surface, that ray which has the smaller angle of incidence on said first curved surface will have the greater angle of incidence on the second curved surface.

6. An optical instrument involving the combination of total reflecting prisms providing two terminal flat and two intermediate curved surfaces angularly disposed to have light rays transmitted from one to the other in succession, said reflecting surfaces having a relative position such that when two symmetrically located rays in any plane other than one parallel to the geometric axis of the curved reflecting surface cylinder in a beam of light impinge upon the first curved reflecting surface, that ray which has the smaller angle of incidence on said first curved reflecting surface will have the greater angle of incidence on the second curved reflecting surface.

7. An optical instrument comprising a combination of total reflecting prisms having two curved and two flat reflecting surfaces angularly disposed to have light rays transmitted from one to the other in succession, and providing an optical plane of projection, the geometric axes of the curved reflecting surfaces forming an angle equal to the angle formed by the flat reflecting surfaces.

8. An optical instrument comprising a combination of total reflecting prisms having two curved and two flat reflecting surfaces providing an optical plane of projection, the said prisms being united to each other and provided with integral diaphragms affording optical openings.

In testimony whereof, I have hereunto set my hand.

HARRY F ROACH.